United States Patent
Molholm

(10) Patent No.: US 12,464,255 B2
(45) Date of Patent: Nov. 4, 2025

(54) SYNCHRONIZATION OF IMAGE CAPTURE AND VISUAL LIGHT TRANSMISSION

(71) Applicant: APPLE INC., Cupertino, CA (US)

(72) Inventor: Robert Molholm, Scotts Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/026,191

(22) PCT Filed: Sep. 7, 2021

(86) PCT No.: PCT/US2021/049196
§ 371 (c)(1),
(2) Date: Mar. 14, 2023

(87) PCT Pub. No.: WO2022/060589
PCT Pub. Date: Mar. 24, 2022

(65) Prior Publication Data
US 2023/0370728 A1    Nov. 16, 2023

Related U.S. Application Data

(60) Provisional application No. 63/080,920, filed on Sep. 21, 2020.

(51) Int. Cl.
*H04N 23/75* (2023.01)
*G02F 1/163* (2006.01)
(Continued)

(52) U.S. Cl.
CPC ............. *H04N 23/75* (2023.01); *H04N 23/56* (2023.01); *H04N 23/61* (2023.01);
(Continued)

(58) Field of Classification Search
CPC ........ H04N 23/75; H04N 23/56; H04N 23/61; H04N 23/661; H04N 23/665; G02C 11/10; G02C 7/101; G02B 27/0172; G02F 1/163
See application file for complete search history.

(56) References Cited

U.S. PATENT DOCUMENTS

| 8,960,898 B1 * | 2/2015 | Etzkorn | ................. G02C 7/049 351/159.03 |
| 9,898,995 B2 | 2/2018 | Kim et al. | |

(Continued)

FOREIGN PATENT DOCUMENTS

| CN | 111670405 A | 9/2020 |
| EP | 3413124 A1 | 12/2018 |

(Continued)

OTHER PUBLICATIONS

EP 3 521 910 A1 English Translation (Year: 2018).*

(Continued)

*Primary Examiner* — Twyler L Haskins
*Assistant Examiner* — John H Morehead, III
(74) *Attorney, Agent, or Firm* — Thompson Hine LLP

(57) ABSTRACT

Various implementations disclosed herein include devices, systems, and methods that control a visual light transmission property of a viewing portion (e.g., glass) of a first device during an image capture event in which an image of the first device is captured by a second device. In one implementation, the portion of the first device is quickly transitioned from a first state to a second state (e.g., being made lighter or darker) for a camera exposure. The dark appearance of the portion of a first device while outdoors may be transitioned to a light appearance while a photo or video is captured. In a second implementation, the portion of the first device is maintained in a first state while a photo or video is captured. For example, the clear appearance of the portion of the first (Continued)

device while inside may be maintained while a photo or video is captured using a flash.

23 Claims, 5 Drawing Sheets

(51) Int. Cl.
*H04N 23/56* (2023.01)
*H04N 23/60* (2023.01)
*H04N 23/61* (2023.01)
*H04N 23/661* (2023.01)

(52) U.S. Cl.
CPC ......... *H04N 23/661* (2023.01); *H04N 23/665* (2023.01); *G02F 1/163* (2013.01)

(56) References Cited

U.S. PATENT DOCUMENTS

2016/0070106 A1 3/2016 Park
2018/0288333 A1* 10/2018 VanBlon ............... H04N 5/76
2019/0251346 A1 8/2019 Oami et al.

FOREIGN PATENT DOCUMENTS

EP 3521910 A1 * 8/2019 ............. G02C 7/101
WO 2004/082285 A1 9/2004

OTHER PUBLICATIONS (PCT) European Patent Office (ISA/EP), International Search Report and Written Opinion of the International Searching Authority, International Application No. PCT/US2021/049196, 13 pages, Dec. 14, 2021.

European Patent Office, Communication Pursuant to Article 94(3) EPC, European Patent Application No. 21791071.0, 7 pages, Jul. 2, 2025.

* cited by examiner

Determine that an image capture event will occur in which an image of a portion of a first device will be captured in an image by a second device separate from the first device — 202

In accordance with determining that the image capture event will occur, control a visual light transmission property of the portion of the first device during the image capture event — 204

SYNCHRONIZATION OF IMAGE CAPTURE AND VISUAL LIGHT TRANSMISSION

CROSS-REFERENCE TO RELATED APPLICATIONS

This patent application is the national stage of International Application No. PCT/US2021/049196 filed on Sep. 7, 2021, which claims the benefit of U.S. Provisional Application No. 63/080,920 filed on Sep. 21, 2020, entitled "SYNCHRONIZATION OF IMAGE CAPTURE AND VISUAL LIGHT TRANSMISSION," each of which is incorporated herein by this reference in its entirety.

TECHNICAL FIELD

The present disclosure generally relates to electronic devices and, in particular to, devices and methods that adjust the visual light transmission of portions of electronic devices that can be at least partially transparent.

BACKGROUND

Various products have portions that are at least partially transparent, e.g., clear, lightly shaded, darkly shaded, etc. Such portions may not have a desired appearance in photographs and videos. For example, if such a portion is shaded, an object on the far side of the portion may not be visible through the portion in a photograph even though it may be desirable to have that object be visible through the portion in the photograph.

SUMMARY

Various implementations disclosed herein include devices, systems, and methods that control a visual light transmission property of a viewing portion (e.g., glass) of a first device during an image capture event in which an image of the first device is captured by a second device. In one implementation, the portion of the first device is quickly transitioned from a first state to a second state (e.g., being made lighter or darker) for a camera exposure. The dark appearance of the portion of a first device while outdoors may be transitioned to a light appearance while a photo or video is captured. In a second implementation, the portion of the first device is maintained in a first state while a photo or video is captured. For example, the clear appearance of the portion of the first device while inside may be maintained while a photo or video is captured using a flash, even though the flash would have otherwise triggered a transition to a second, darker state.

One exemplary method involves determining that an image capture event will occur in which an image of a portion of a first device (e.g., a hand-held device or a head-mounted-device (HMD)) will be captured in an image by a second device (e.g., a mobile device that includes a camera) separate from the first device. In one example, when a second device's photo button is pressed, the second device sends a message to the first device to trigger the portion to remain clear or change to be clear during the photo. The second device may wait for an acknowledgement or a predetermined threshold amount of time before initiating the image capture or exposure. In some implementations, messages are sent between the devices via an RF signal or light signal/coded flash. In some implementations, whether the first device will be in the image is determined by determining relative positioning and/or orientations of the devices using sensors on the one or both devices.

The exemplary method further involves, in accordance with determining that the image capture event will occur, controlling a visual light transmission property of the portion of the first device during the image capture event. This may involve controlling shading of electrochromic material (e.g. glass) to be clear, dark, or a predefined percentage shaded. In one example, a second device triggers the first device to transition the portion to be more transmissive/lighter (e.g., clear) so that the portion remains clear during an image exposure, and then is transitioned back to a darker (e.g., less clear) state. In some implementations, if no image capture occurs within a timeout period, the first device transitions the portion back to its prior state automatically. In another example, the second device triggers the first device to remain lighter (e.g., clear) during a flash that accompanies an image exposure.

In some implementations, for example, where the devices are not paired, the controlling is further based on user input or a user action, such as user gestures, audible commands, gaze direction, manual interaction with UI controls, etc. Requiring such additional input or action may help ensure that another person's camera (e.g., a paparazzi camera) will not undesirably control a first device (e.g., a device being used by a celebrity who does not want the paparazzi to be able to change his or her device).

In some implementations, controlling the visual light transmission of a portion of a first device during an image capture event facilitates capturing images that are better suited for modification. For example, such images may include more content corresponding to the user or the physical environment than otherwise and thus may represent or include more information about the user or environment. Such additional information may facilitate various computer vision processes including, but not limited to, hallucination, inpainting, or other techniques used to adjust the images to remove/erase the first electronic device and/or machine learning models used to interpret and provide information about the user and/or environment to improve the experience of the user of the second device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
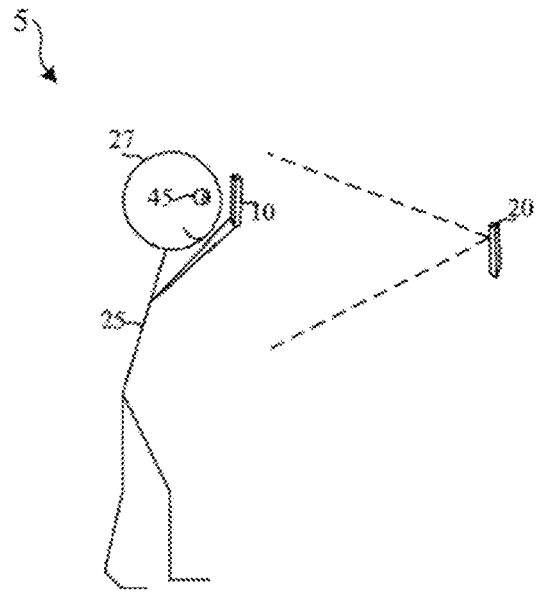
FIG. 1A illustrates an environment is which a first device controls visual light transmission while it is captured in an image captured by a second device according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1A illustrates a physical environment 5 including a first device 10 and a second device 20. In this example, user 25 holds the first device 10 while an image is captured by the second device 20. In some implementations, the visual light transmission property of a portion of the first device 10 is controlled during the capturing of the image by the second device 20. For example, the visual light transmission property of the portion of the first device 10 may be controlled to enable the capturing of (or improve) the appearance of the eyes 45 of the user 10 in images captured by the second device 20, e.g., by enabling more light from the user's eyes 45 to pass through the portion of the first device 10 and be captured by the image sensor of the second device 20 during the image capture event.

Figure 1B:
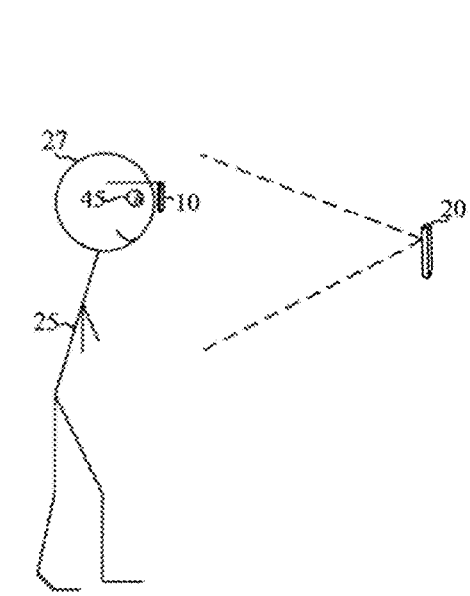
FIG. 1B illustrates another environment is which a first device controls visual light transmission while it is captured in an image captured by a second device according to some implementations.

While the device 10 is illustrated as a hand-held device, other implementations involve devices with which a user interacts without holding and devices worn by a user. In some implementations, as illustrated in FIG. 1A, the device 10 is a handheld electronic device (e.g., a smartphone or a tablet). In some implementations the device 10 is a laptop computer or a desktop computer. In some implementations, as illustrated in FIG. 1B, the device 10 is a wearable device such as a head-mounted device (HMD).

Moreover, while these examples and other examples discussed herein illustrate a single device 10 in a physical environment 5, the techniques disclosed herein are applicable to multiple devices as well as to multiple real-world environments. For example, the functions of device 10 may be performed by multiple devices.

In some implementations, the device 10 has a graphical user interface (GUI), one or more processors, memory and one or more modules, programs or sets of instructions stored in the memory for performing multiple functions. In some implementations, the user 25 interacts with one or both of the first device 10 and the second device 20, e.g., using the second device 20 to take a selfie-photo while holding or wearing the first device 10. In other implementations, one or more other users use device 20.

Figure 2:
FIG. 2 is a flowchart representation of a method for controlling visual light transmission during an image capture event.

FIG. 2 is a flowchart representation of a method for controlling visual light transmission during an image capture event in accordance with some implementations. In some implementations, the method 200 is performed by a device, such as a mobile device, HMD, desktop, laptop, or server device. In some implementations, the method 200 is performed by processing logic, including hardware, firmware, software, or a combination thereof. In some implementations, the method 200 is performed by a processor executing code stored in a non-transitory computer readable medium.

At block 202, the method 200 determining that an image capture event will occur in which an image of a portion of a first device will be captured in an image by a second device separate from the first device. This may involve determining that the second device will perform an image capture event based on identifying an intention for the image capture event (e.g., as evidenced by focusing or other pre-capture device activity) or detecting that an image capture input is received at the second device.

In one example, when a second device's photo button is pressed, the second device sends a message to the first device to trigger the portion to remain clear or change to be clear during the photo. The second device may wait for an acknowledgement or a predetermined threshold amount of time before initiating the image capture or exposure. In some implementations, messages are sent between the devices via an RF signal or light signal/coded flash. In some implementations, whether the first device will be in the image is determined by determining relative positioning and/or orientations of the devices using sensors on the one or both devices.

At block 204, the method 200, in accordance with determining that the image capture event will occur, controls a visual light transmission property of the portion of the first device during the image capture event. This may involve controlling shading of electrochromic material (e.g., glass) to be clear, dark, or a predefined percentage shaded.

In some implementations, for example, where the devices are not paired, the controlling is further based on user input or a user action, such as user gestures, audible commands, gaze direction, manual interaction with UI controls, etc. Requiring such additional input or action may help ensure that another person's camera (e.g., a paparazzi camera) will not undesirably control a first device (e.g., a device being used by a celebrity who does not want the paparazzi to be able to change his or her device).

Figure 3:
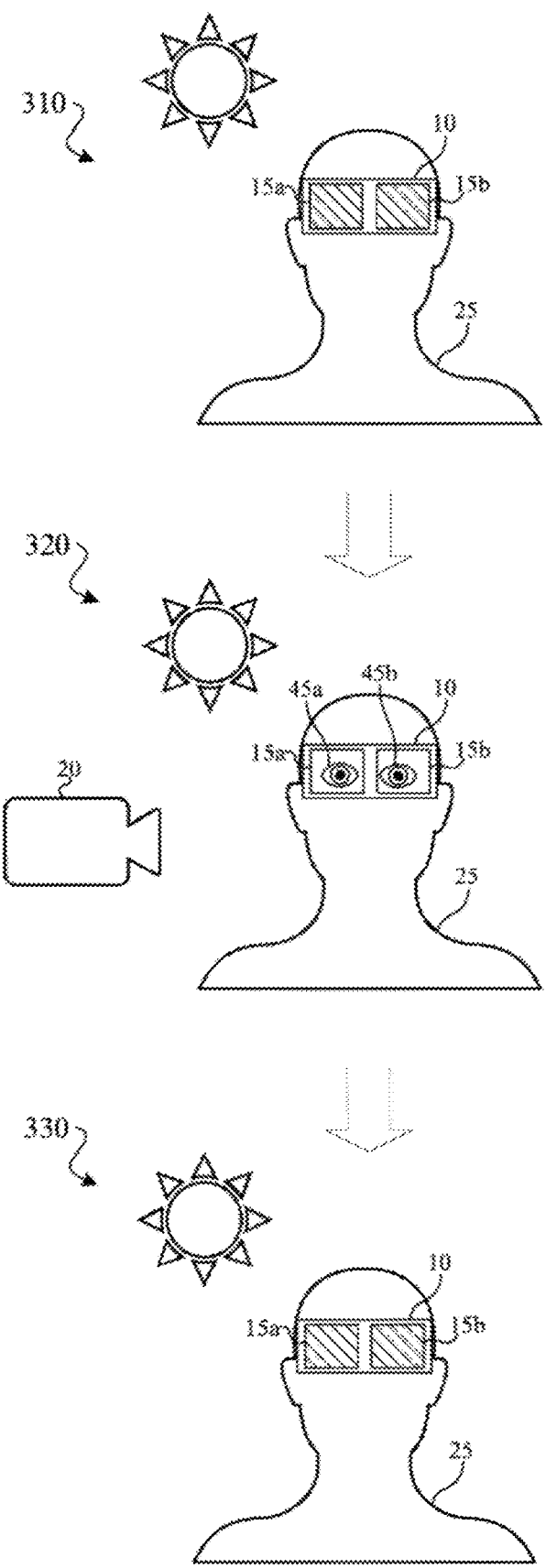
FIG. 3 illustrates an example of controlling visual light transmission during an image capture event.

In one example, a second device triggers the first device to transition the portion to be more transmissive/lighter (e.g., clear) so that the portion remains clear during an image exposure, and then is transitioned back to a darker (e.g., less clear) state. FIG. 3 illustrates an example of controlling visual light transmission during an image capture event. In this example, during a first time period 310, the user 25 is wearing the first device 10 in a bright environment and portions 15a-b (e.g., electrochromic material) are in a first state (e.g., dark) that is relatively shaded. For example, the portions 15a-b of the first device 10 may be lenses or other viewing portions that are shaded to reduce the amount of light visible via the user's eyes 45a-b, e.g., acting as sunglasses. During a second time period 320, an image capture event is initiated on the second device 20 and the second device 20 sends a message to the first device 10 to trigger the portions 15a-b to remain clear or change to be clear during the image capture event. The first device 10 transitions the portions 15a-b to a second state (e.g., clear) such that eyes 45a-b are more visible through the portions 15a-b to the second device 20 during the image capture event. At time 330, following the image capture event, the first device 10 transitions that portions 15a-b back to the first state (e.g., dark).

Figure 4:
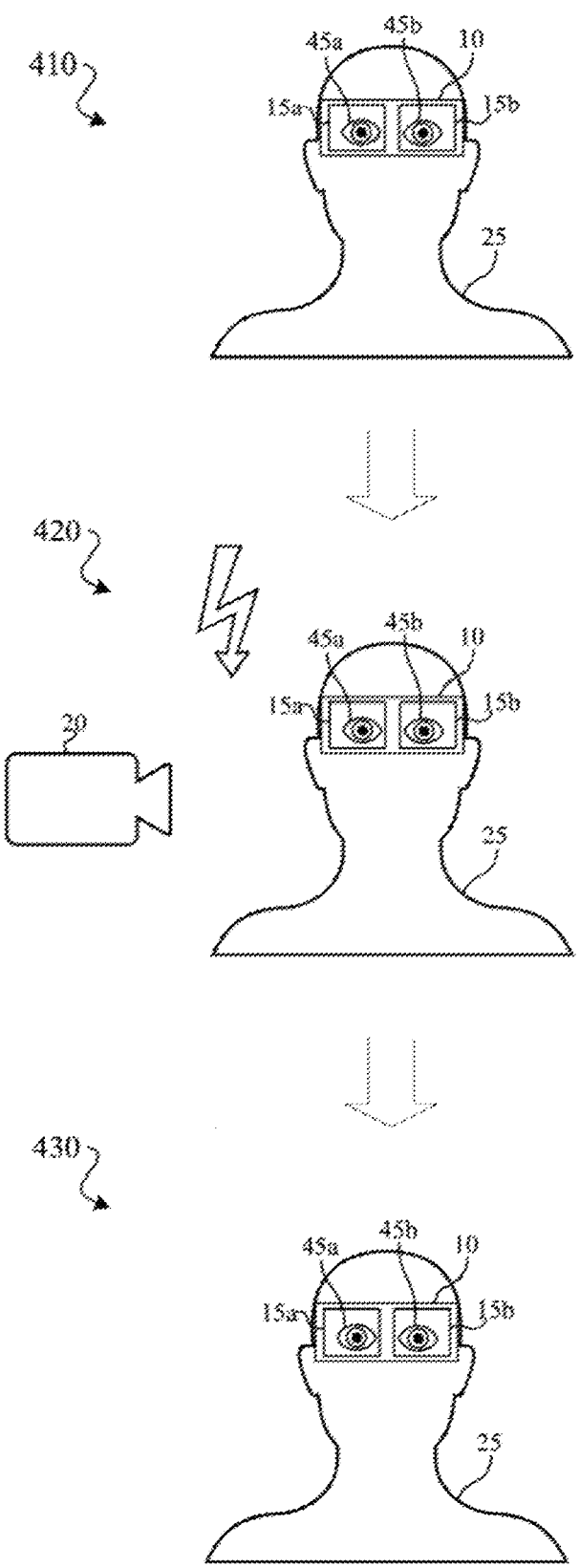
FIG. 4 illustrates another example of controlling visual light transmission during an image capture event.

In some implementations, if no image capture occurs within a timeout period, the first device transitions the portion back to its prior state automatically. In another example, the second device triggers the first device to remain lighter (e.g., clear) during a flash that accompanies an image exposure. FIG. 4 illustrates another example of controlling visual light transmission during an image capture event. In this example, during a first time period 410, the user 25 is wearing the first device 10 and portions 15a-b are in a first state (e.g., clear) that is relatively unshaded. For example, the portions 15a-b of the first device 10 may be lenses or other viewing portions that are clear in the user's current indoor environment. During a second time period 420, an image capture event is initiated on the second device 20 and the second device 20 sends a message to the first device 10 to trigger the portions 15a-b to remain clear or change to be clear during the image capture event. The first device 10 controls the portions 15a-b to remain in the first state (e.g., clear) such that eyes 45a-b remain visible through the portions 15a-b to the second device 20 during the image capture event. At time 430, following the image capture event, portions 15a-b remain in the first state (e.g., clear).

Figure 5:
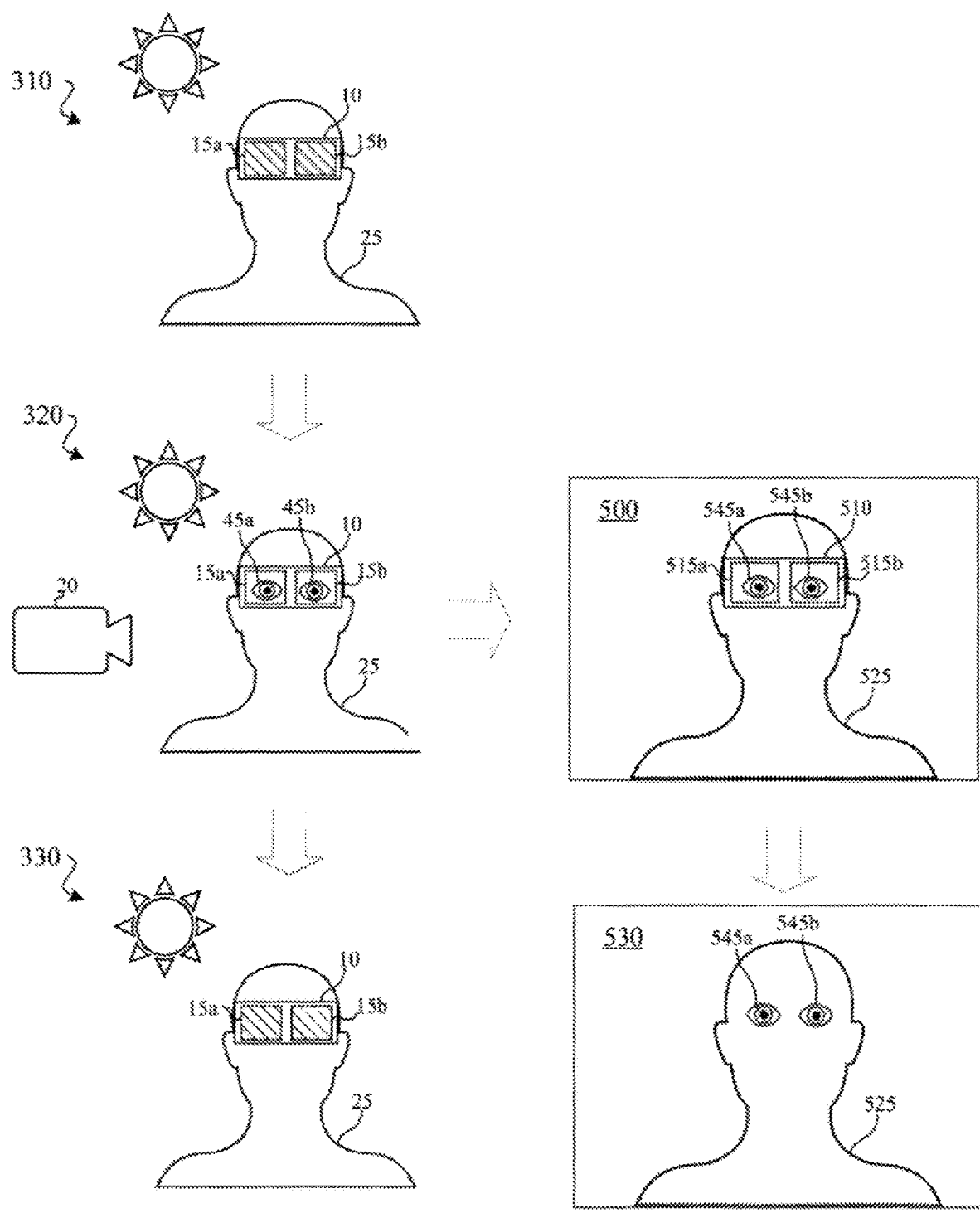
FIG. 5 illustrates an exemplary of controlling visual light transmission during an image capture event and adjusting an image captured during the image capture event.

FIG. 5 illustrates an exemplary of controlling visual light transmission during an image capture event and adjusting an image captured during the image capture event. In this example, during a first time period 310, the user 25 is wearing the first device 10 and portions 15a-b are in a first state (e.g., dark) that is relatively shaded. During a second time period 320, an image capture event is initiated on the second device 20 and the second device 20 sends a message to the first device 10 to trigger the portions 15a-b to remain clear or change to be clear during the image capture event. The first device 10 transitions the portions 15a-b to a second state (e.g., clear) such that eyes 45a-b are more visible through the portions 15a-b to the second device 20 during the image capture event. At time 330, following the image capture event, the first device 10 transitions that portions 15a-b back to the first state (e.g., dark).

An image 500 that is captured during the image capture event includes a depiction 525 of the user 25 and a depiction of the device 510. Portions 515a-b of the depiction of the device 510 are clear and thus depictions 545a-b of the user's eyes 45a-b are included within the image 500. Such depictions 545a-b would not be visible or would be less visible in the image 500 had portions 15a-b been in the second state during the second time period 320 when the image event occurred.

In some implementations, as illustrated in FIG. 5, controlling the visual light transmission of one or more portions 15a-b of a first device 10 during an image capture event facilitates capturing images that are better suited for modification. In this example, image 500 includes may include more content (e.g., depictions 545a-b of the user's eyes 45a-b) than otherwise and thus may represent or include more information about the user and/or environment. Such additional information may facilitate various computer vision processes including, but not limited to, hallucination, inpainting, or other techniques used to adjust the images to remove/erase the depiction 510 of the first device 10 and/or machine learning models used to interpret and provide information about the user and/or environment to improve the experience of the user of the second device.

In the example of FIG. 5, machine learning process receives image 500 as input and performs a device-removal/erasing task to remove the depiction 510 of the first device 10 to produce image 530, which includes the depiction 525 of the user 25 without the depiction 510 of the first device 10. For example, this may involve generating/hallucinating image content at the image pixel locations that were previously occupied in image 500 by the depiction 510 of the first device 10. The image 530 includes the depictions 545a-b of the user's eyes 45a-b. Such depictions 545a-b would have needed to have been hallucinated or may have otherwise appeared differently had the depictions 545a-b not been visible or been less visible in the image 500. Moreover, other content of the image 530 may be more accurate or otherwise better since the hallucinating/generating of image content has move or better information to use. Accordingly, controlling the visual light transmission property of the portions 15a-b during the image capture event may facilitate creation of a better image 530 with a depiction 525 of the user 25 without a depiction 510 of the first device 10 than would otherwise be possible.

In some implementations, controlling visual light transmission during an image capture event is based on user parameters and/or user input. A user may change the way a first device appears (e.g., the transparency of portions thereof) based on the user's particular use cases and desires. In some implementations, for example, a user may intentionally choose to have a portion appear dark in an image. In other implementations, a user may select a color, e.g., a blue tint, for a portion of the device. In other implementations, the user may choose to have the first device not react to an image capture event. For example, based on a user preference, the first device may not control visual light transmission based on determining that an image capture event will occur, i.e. the portions will not change. Additionally, the user could choose to have the first device react only to second devices that are known and trusted, e.g. devices belonging to contacts of the user or could have the first device react only after receiving an acknowledgement from the user. For example, based on detecting an image capture event, a user may be presented with an option to enable control/change of visual light transmission based on detecting that image capture event and/or future image capture events, e.g., within a limited period of time such as the next 5 minutes.

In some implementations, controlling the visual light transmission property of the portion of the first device during the image capture event occurs according to a transition characteristic (e.g., lighter, darker, etc.), where the transition characteristic is based on a user setting. For example, a user may specify how much lighter or darker a display may become during a transition.

Figure 6:
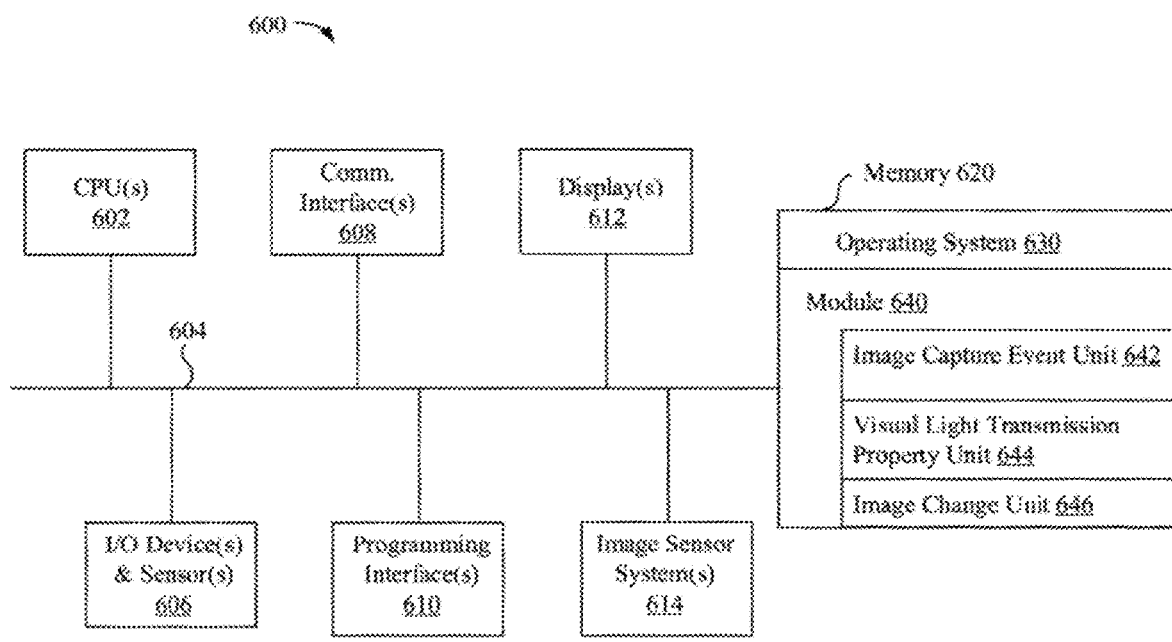
FIG. 6 is a block diagram of an example device in accordance with some implementations.

In some implementations, the first device has a display (e.g., an optical see through display) that provides an indication that an image of the first device is being captured. The indication may indicate from the direction and/or the distance from which such an image is being captured FIG. 6 is a block diagram of an example of a device 600 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a user experience to a user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), microelectromechanical system (MEMS), a retinal projection system, and/or the like display types. In some implementations, the one or more displays 612 correspond to diffractive, reflective, polarized, holographic, etc. waveguide displays. In one example, the device 10 includes a single display. In another example, the device 60 includes a display for each eye of the user 25, e.g., an HMD.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 620 and a module 640.

The operating system 630 includes procedures for handling various basic system services and for performing hardware dependent tasks. In some implementations, the module 640 is configured to controlling visual light transmission during an image capture event. To that end, in various implementations, the module 640 includes an image capture event unit 642, a visual light transmission property unit 644, and an image change unit 646.

In some implementations, the image capture event unit 642 is configured to determine that an image capture event will occur. For example, determining that an image capture event will occur in which an image of a portion of a first device 10 will be captured in an image by a second device 20 separate from the first device 10. The first device 10 receives a message from the second device 20 based on a second device's photo button having been pressed. To these ends, in various implementations, the unit includes instructions and/or logic therefor, and heuristics and metadata therefor.

In some implementations, the visual light transmission property unit 644 is configured to, in accordance with the image capture event unit 642 determining that the image capture event will occur, control a visual light transmission property during the image capture event. This may involve controlling shading of electrochromic material of one or more displays 612 or other portion of the device 600 to be clear, dark, or a predefined percentage shaded. To these ends, in various implementations, the unit includes instructions and/or logic therefor, and heuristics and metadata therefor.

In some implementations, the image change unit 646 is configured to adjusting an image captured during an image capture event, for example, to remove visible portions of depiction of an electronic device in the image. To these ends, in various implementations, the unit includes instructions and/or logic therefor, and heuristics and metadata therefor.

Although the units and modules of FIG. 6 are shown as residing on a single device (e.g., the device 600), it should be understood that in other implementations, any combination of these units may be located in separate computing devices.

Moreover, FIG. 6 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   determining that a second device will perform an image capture event in which an image of a portion of a first device will be captured by the second device while the first device is worn by a user in front of at least one eye of the user, wherein the second device is separate from the first device, wherein the first device is configured to darken in response to a lighting condition in a way that prevents visibility of the at least one eye through the portion of the first device in the light condition; and
   in accordance with determining that the image capture event will occur, controlling a visual light transmission property of the portion of the first device during the image capture event such that the at least one eye of the user is visible through the portion of the first device in the image in spite of the light condition being present during the image capture event.

2. The method of claim 1, wherein the portion of the first device comprises electrochromic material.

3. The method of claim 1, wherein controlling the visual light transmission property comprises transitioning the portion of the first device from a first state to a second state, wherein the second state is more transmissive than the first state.

4. The method of claim 3, wherein the second state is a clear state.

5. The method of claim 1, wherein:
   the portion of first device is configured to transition from a second state to a first state in response to a camera flash, wherein the second state is more transmissive than the first state; and
   controlling the visual light transmission property comprises preventing the portion of the first device from transitioning from the second state to the first state during a camera flash associated with the image capture event.

6. The method of claim 1, wherein determining that the second device will perform an image capture event comprises:

identifying an intention for the image capture event; or
detecting that an image capture input is received at the second device.

7. The method of claim 1, wherein determining that the second device will perform an image capture event comprises receiving a radio-frequency (RF) or coded flash signal from the second device.

8. The method of claim 7, wherein the second device waits for an acknowledgment from the first device before initiating the image capture event.

9. The method of claim 1, wherein determining that the image capture event will occur comprises determining that the first device will be in the image based on determining relative positioning or orientations of the first device and second device using one or more sensors on the first device or second device.

10. The method of claim 1, wherein controlling the visual light transmission property of the portion of the first device during the image capture event occurs according to a transition characteristic, wherein the transition characteristic is based on a user setting.

11. The method of claim 1, wherein the first device comprises a display, wherein the display provides an indication that an image of the first device is being captured.

12. The method of claim 1, wherein the first device is a head mounted device and the portion of the first device is configured to be positioned in front of an eye of a user.

13. A first device comprising:
a body portion configured to be supported by a head of a user;
a viewing portion attached to the body portion and configured to be positioned in front of an eye of the user, the viewing portion comprising electrochromic material;
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
determining that an image capture event will occur in which an image of the viewing portion will be captured by a second device separate from the first device, wherein the first device is configured to darken in response to a lighting condition in a way that prevents visibility of the at least one eye through the portion of the first device in the light condition; and
in accordance with determining that the image capture event will occur, controlling a visual light transmission property of the viewing portion during the image capture event such that the eye of the user is visible through the viewing portion of the first device in the image in spite of the light condition being present during the image capture event.

14. The device of claim 13, wherein controlling the visual light transmission property comprises transitioning the electrochromic material from a first state to a second state, wherein the second state is more transmissive than the first state.

15. The first device of claim 14, wherein the second state is a clear state.

16. The first device of claim 15, wherein:
the electrochromic material is configured to transition from a second state to a first state in the response to a camera flash, wherein the second state is more transmissive than the first state; and
controlling the visual light transmission property comprises preventing the electrochromic material from transitioning from the second state to the first state during a camera flash associated with the image capture event.

17. The first device of claim 13, wherein determining that the image capture event will occur comprises detecting that an image capture input is received at the second device.

18. The first device of claim 13, wherein determining that the image capture event will occur comprises receiving a radio-frequency or coded flash signal from the second device.

19. The first device of claim 13, wherein determining that the image capture event will occur comprises determining that the viewing portion will be in the image based on determining relative positioning or orientations of the first device and second device using one or more sensors on the first device or second device.

20. A non-transitory computer-readable storage medium, storing program instructions executable by one or more processors to perform operations comprising:
determining that an image capture event will occur in which an image of a portion of a first device will be captured in an image by a second device while the first device is worn by a user in front of at least one eye of the user, wherein the second device is separate from the first device, wherein the first device is configured to darken in response to a lighting condition in a way that prevents visibility of the at least one eye through the portion of the first device in the light condition; and
in accordance with determining that the image capture event will occur, controlling a visual light transmission property of the portion of the first device during the image capture event such that the at least one eye of the user is visible through the portion of the first device in the image in spite of the light condition being present during the image capture event.

21. The non-transitory computer-readable storage medium of claim 20, wherein the portion of the first device comprises electrochromic material.

22. The non-transitory computer-readable storage medium of claim 20, wherein controlling the visual light transmission property comprises transitioning the portion of the first device from a first state to a second state, wherein the second state is more transmissive than the first state.

23. The non-transitory computer-readable storage medium claim 20, wherein controlling the visual light transmission property comprises preventing the portion of the first device from transitioning from the second state to the first state during a camera flash associated with the image capture event.

* * * * *

UNITED STATES PATENT AND TRADEMARK OFFICE
CERTIFICATE OF CORRECTION

| | | |
|---|---|---|
| PATENT NO. | : 12,464,255 B2 | Page 1 of 1 |
| APPLICATION NO. | : 18/026191 | |
| DATED | : November 4, 2025 | |
| INVENTOR(S) | : Robert Molholm | |

It is certified that error appears in the above-identified patent and that said Letters Patent is hereby corrected as shown below:

In the Claims

Claim 1, Column 10, Line 38 reads:
"... first device in the light condition; ..."
Should read:
--... first device in the lighting condition; ...--

Claim 1, Column 10, Line 44 reads:
"... in spite of the light condition ..."
Should read:
--... in spite of the lighting condition ...--

Signed and Sealed this
Twenty-third Day of December, 2025

John A. Squires
*Director of the United States Patent and Trademark Office*